US010106415B2

(12) United States Patent
Le Godec et al.

(10) Patent No.: US 10,106,415 B2
(45) Date of Patent: Oct. 23, 2018

(54) PRODUCTION OF BORON PHOSPHIDE BY REDUCTION OF BORON PHOSPHATE WITH AN ALKALINE METAL

(71) Applicants: UNIVERSITE PIERRE ET MARIE CURIE (PARIS 6), Paris (FR); CENTRE NATIONAL DE LA RECHERCHE SCIENTIFIQUE (CNRS), Paris (FR); UNIV PARIS XIII PARIS-NORD VILLETANEUSE, Villetaneuse (FR)

(72) Inventors: Yann Le Godec, Paris (FR); Vladimir Mukhanov, Paris (FR); Vladimir Solozhenko, Clichy (FR); Petr Sokolov, Paris (FR)

(73) Assignees: SORBONNE UNIVERSITE, Paris (FR); CENTRE NATIONAL DE LA RECHERCHE SCIENTIFIQUE (CNRS), Paris (FR); UNIV PARIS XIII PARIS-NORD VILLETANEUSE, Villetaneuse (FR)

( * ) Notice: Subject to any disclaimer, the term of this patent is extended or adjusted under 35 U.S.C. 154(b) by 0 days.

(21) Appl. No.: 15/107,380

(22) PCT Filed: Dec. 23, 2014

(86) PCT No.: PCT/EP2014/079236
§ 371 (c)(1),
(2) Date: Jun. 22, 2016

(87) PCT Pub. No.: WO2015/097244
PCT Pub. Date: Jul. 2, 2015

(65) Prior Publication Data
US 2017/0022061 A1    Jan. 26, 2017

(30) Foreign Application Priority Data
Dec. 23, 2013 (EP) .................................... 13306838

(51) Int. Cl.
*C01B 25/08* (2006.01)

(52) U.S. Cl.
CPC ................................ *C01B 25/084* (2013.01)

(58) Field of Classification Search
None
See application file for complete search history.

(56) References Cited

U.S. PATENT DOCUMENTS

| 2,966,424 | A | * | 12/1960 | Ruehrwein | C01B 25/06 23/295 R |
| 3,260,571 | A | | 7/1966 | Gruber | |
| 3,423,218 | A | * | 1/1969 | Gruber | C01B 25/06 148/400 |
| 5,552,356 | A | * | 9/1996 | Perchenek | C04B 35/117 501/127 |

FOREIGN PATENT DOCUMENTS

| EP | 1 564 820 A1 | 8/2005 |
| GB | 931336 | 7/1963 |
| WO | WO 03/065465 A2 | 8/2003 |

OTHER PUBLICATIONS

Cueilleron et al., "Crystalline Boron Phosphide", Bulletin de la Societe Chimique de France, vol. 2, 1965, pp. 402-404, with English language abstract.
Feng et al., "Low temperature synthesis of boron phosphide nanocrystals", Materials Letters, Apr. 2005, vol. 59, pp. 865-867.
International Search Report for International Application No. PCT/EP2014/079236, dated Mar. 23, 2015.
K. P. Ananthanarayanan et al., "Synthesis of single crystal boron phosphide", J. of Crystal Growth, 1973, vol. 20, pp. 63-67.
Mukhanov et al., "Self-Propagating Hight-Temperature Synthesis of Boron Phosphide", J. of Superhard Materials, Nov. 2013, vol. 35, No. 6, pp. 415-417.

* cited by examiner

*Primary Examiner* — Guinever S Gregorio
(74) *Attorney, Agent, or Firm* — Birch, Stewart, Kolasch & Birch, LLP

(57) ABSTRACT

The present invention concerns a process for the production of boron phosphide BP comprising the reduction of boron phosphate $BPO_4$ with at least one alkaline earth metal (EA) according to Equation (1): $BPO_4 + 4\ EA \rightarrow BP + 4\ EA(O)$ (1).

14 Claims, No Drawings

PRODUCTION OF BORON PHOSPHIDE BY REDUCTION OF BORON PHOSPHATE WITH AN ALKALINE METAL

FIELD OF THE INVENTION

The present invention concerns a safe, convenient, fast and low cost process for the production of boron phosphide (BP).

BACKGROUND OF THE INVENTION

Boron phosphide, BP, is a wide band gap $A^{III}B^{V}$ semiconductor compound with a diamond-like structure.

It is refractory and is characterized by high thermal and chemical stability (up to 1500 K in air), remarkable thermal conductivity and very high hardness ($H_V$ of about 30 GPa) well-above that of tungsten carbide (between 18 and 22 GPa) or silicon carbide (25 GPa), the most prominent materials used in the industry of very hard materials.

In spite of these outstanding properties, boron phosphide has met with limited use to date because of the lack of a relatively simple and economical method for its production. As a result, boron phosphide is not commercially available at an industrial scale.

Boron phosphide has been synthesized by direct interaction of the elements or by reaction between halogenides of boron and phosphorus in the presence of sodium. Boron phosphide single crystals may be grown by the crystallization from flux solutions or by gas-transport reactions in two-zone furnaces.

WO 03/065465 and EP1564820 disclose a process for depositing boron phosphide on semiconductors. The method used is the atmospheric pressure metal organic chemical vapor deposition (MOCVD) using a starting material system of triethylborane/phosphine/hydrogen $((C_2H_5)_3B/PH_3/H_2)$ at a temperature comprised between 950 and 1100° C.

GB 931,336 discloses several processes for the preparation of boron phosphide starting from metallic phosphorus or an alloy thereof and metallic boron, a boron alloy or boron carbide at a temperature corresponding at least to the sintering temperature of boron phosphide.

U.S. Pat. No. 3,260,571 discloses the preparation of boron phosphides wherein the ratio B/P is comprised between 6:1 and 100:1. These boron phosphides are prepared by reacting metallic phosphorus and boron, by reacting phosphorus halogenides and boron halogenides, by reacting boron and phosphine or from phosphates and borates in a molten metal in the presence of a reducing agent such as carbon.

Ananthanaryanan et al (Synthesis of single crystal boron phosphide. *Journal of crystal growth*, 1973, vol. 20, pages 63-67) disclose the preparation of boron phosphide from metallic phosphorus, boron and boron oxides, a mixture of boron and phosphorus.

As illustrated by prior art, the methods employed for preparing boron phosphide to date require expensive, toxic and aggressive reagents, complicated technical implementation, high labour intensity and time consumption.

There is therefore a need for a simple, convenient and low-cost process for the preparation of boron phosphide.

SUMMARY OF THE INVENTION

The present invention provides such a process comprising the reduction of boron phosphate $BPO_4$ with at least one alkaline earth metal (EA) according to Equation (1):

$$BPO_4 + 4EA \rightarrow BP + 4EA(O) \quad (1)$$

The process according to the invention is capable of affording boron phosphide in a simple and economical manner using readily available, inexpensive and safe starting materials in a very rapid manner, thereby overcoming the deficiencies of prior art methods. The process can be conducted by simple heating of a mixture comprising at least one alkaline earth metal and boron phosphate without the need for high pressures or complex equipment and affords boron phosphide in a very short reaction time.

Because the reaction between boron phosphate and an alkaline earth metal is highly exothermic, it proceeds via a Self-Propagating High-Temperature Synthesis.

The concept of Self-Propagating High-Temperature Synthesis is well-known in the art. The synthesis is initiated by heating typically a part of a mixture comprising the reagents. Once initiated, a wave of exothermic reaction sweeps through the remaining mixture. The combustion wave maintains the temperature and the reaction proceeds in the entire mixture without the need for further input of heat.

Consequently, the process according to the present invention does not necessitate that the reaction is conducted under continuous input of heat and therefore results in low-energy consumption.

The present invention therefore concerns a process for preparing boron phosphide comprising the step of reducing boron phosphate with at least one alkaline earth metal (EA), advantageously calcium and/or magnesium, preferably magnesium.

The present invention also concerns the use of at least one alkaline earth metal, advantageously calcium and/or magnesium, preferably magnesium as a reducing agent for the preparation of boron phosphide.

The present invention further concerns the use of a mixture comprising at least one alkaline earth metal, preferably calcium and/or magnesium, more preferably magnesium, and boron phosphate for preparing boron phosphide.

Advantageously, the mixture further comprises a chemical inert diluent, such as NaCl.

DETAILED DESCRIPTION OF THE INVENTION

The present invention concerns a process for the synthesis of boron phosphide comprising the reduction of boron phosphate with at least one alkaline earth metal (EA) according to Equation (1):

$$BPO_4 + 4EA \rightarrow BP + 4EA(O) \quad (1)$$

The "alkaline earth metal" is a group 2 metal chosen from among beryllium (Be), magnesium (Mg), calcium (Ca), strontium (Sr), barium (Ba) and radium (Ra). The at least one alkaline earth metal is advantageously calcium and/or magnesium, and is most preferably magnesium.

In the context of the present invention, the expression "at least one alkaline earth metal" is intended to mean one alkaline earth metal or a mixture of two or more alkaline earth metals. Advantageously, the reduction is performed with calcium, magnesium or a mixture of magnesium and calcium.

The ratio of boron phosphate to the at least one alkaline earth metal is approximately 1:4. It is typically comprised between 1:3.5 and 1:4.5, advantageously between 1:3.8 and 1:4.2. Advantageously, a slight excess of the at least one alkaline earth metal relative to boron phosphate is used; the ratio of boron phosphate to the at least one alkaline earth metal is therefore advantageously comprised between 1:4.0 and 1:4.1 and is more preferably of 1:4.1.

By way of illustration, if two alkaline earth metals EA1 and EA2 are employed, the "ratio of boron phosphate to the at least one alkaline earth metal of 1:4" corresponds to 1 unit of boron phosphate and 4 units of (EA1+EA2).

In the present invention, the reaction is advantageously a Self-Propagating High-Temperature Synthesis. The reduction of boron phosphate by an alkaline earth metal, such as magnesium is highly exothermic and it is only necessary to initiate the reduction of boron phosphate by the at least one alkaline earth metal, such as magnesium.

By "initiate the reduction of boron phosphate by the at least one alkaline earth metal, such as magnesium", it is meant in the sense of the present invention that sufficient heat is applied to at least part of the mixture comprising boron phosphate and the at least one alkaline earth metal for a time sufficient to reach the minimum temperature at which the reduction of boron phosphate by the at least one alkaline earth metal, such as magnesium occurs.

In the sense of the present invention, "at least part of the mixture" is intended to mean that heat is applied to a portion of the mixture or to the entire mixture comprising boron phosphate and the at least one alkaline earth metal. For example, the mixture can be compressed in the form of a pellet, placed onto a substrate such as pressed MgO and the center of its upper surface heated with a flame.

Because the reduction of boron phosphate by the at least one alkaline earth metal is highly exothermic, it is only required that the minimum temperature required for the reduction to occur is reached in part of the mixture comprising boron phosphate and the at least one alkaline earth metal, the heat being produced locally by the reaction then propagating within the entire mixture.

Typically, at least part of the mixture comprising boron phosphate and the at least one alkaline earth metal is heated for initiating locally the reaction between boron phosphate and the alkaline earth metal.

The temperature for initiating the reaction between boron phosphate and the alkaline earth metal is typically comprised between 800 and 1100 K and is preferably of about 900 to 1000 K.

The time during which the reaction must be heated for initiating the reaction depends of the amount of the reagents. It can be readily determined by the skilled person, for example by monitoring the temperature of the mixture.

Typically, the mixture may be heated at this temperature for 10 to 60 seconds, depending on the quantity of the mixture comprising boron phosphate and the at least one alkaline earth metal.

Typical methods to attain these temperatures and initiate the self-propagating high temperature synthesis reaction are known in the art and include for example a tungsten filament, a graphite plate heated by Joule effect, a flame or a laser pulse. The mixture may also be placed in any device known to those skilled in the art enabling to attain the required temperature.

It is of course also possible to perform the reaction under continuous application of heat, for example in an oven or a furnace.

One of the main features of a self-propagating high temperature synthesis is the propagation of the heat produced locally by the exothermic reaction between boron phosphate and the at least one alkaline earth metal within the entire mixture in the form of a combustion wave (or propagation front). Because the combustion wave may reach temperatures well above the ones required for producing boron phosphide, the temperature should be maintained in an acceptable range, for example by heating or cooling the mixture by appropriate means.

The inventors have for example evidenced that if the temperature is too high, undesired boron subphosphide $B_{12}P_2$ is also produced.

In the sense of the present invention, "acceptable range of temperatures" is intended to mean the temperatures at which boron phosphide BP is produced.

In one embodiment according to the present invention, the temperature of the combustion wave is maintained in an acceptable range of temperatures by further adding a chemically inert diluent to the mixture comprising boron phosphate and the at least one alkaline earth metal.

In the sense of the present invention, a "chemically inert diluent" is a compound that does not chemically react with the reactants and the product. Chemically inert diluents are commonly used in Self-Propagating High-Temperature Syntheses and are known in the art. They may be for example potassium chloride or sodium chloride. Advantageously, sodium chloride is used as the chemically inert diluent.

The type and amount of chemically inert diluent is chosen so as to maintain the temperature of the reaction without impairing the propagation of heat necessary for the reaction to take place in the entire mixture.

The amount of chemically inert diluent is advantageously comprised between 40 and 60% by weight, more preferably around 50% by weight, of the total weight of the mixture of boron phosphate, at least one alkaline earth metal and chemically inert diluent.

The reaction is typically performed by mixing boron phosphate, at least one alkaline earth metal and optionally the chemically inert diluent. Advantageously, boron phosphate, the at least one alkaline earth metal and optionally the chemically inert diluent are mixed together and then compressed, for example in the form of a pellet or an ingot. The compression force at which the pellet or the ingot is formed should be sufficient to maintain the integrity of the form during the reaction and to allow the reaction to proceed in the entire mixture. The compression force at which the pellet or the ingot is formed can be readily determined by the person skilled in the art.

Of course, the process can be conducted by any other means known to those skilled in the art provided that boron phosphate, at least one alkaline earth metal and optionally the chemically inert diluent are in contact, for example in a metallurgical mold.

Advantageously, the process is conducted in a sealed container, in order to avoid the oxidation of the alkaline earth metal, such as magnesium by ambient oxygen.

After the initiation step, the reaction is left until the starting materials have been consumed in the entire mixture. The progress of the reaction can be monitored by means known in the art, for example by monitoring the temperature of the reaction. Upon completion of the reaction, the temperature of the mixture decreases and this can be used as an indicator.

Once the reaction has come to completion, boron phosphide is separated from the other materials by methods known in the art, typically by at least one washing with an acidic aqueous solution such as aqueous hydrochloric acid, nitric acid, sulfuric acid or aqua regia, and water.

Preferably, the mixture obtained after completion of the reaction is crushed and washed with the acidic aqueous solution, preferably at elevated temperature, for example at the boiling temperature of the solution.

In one advantageous embodiment, the process for the synthesis of boron phosphide comprises the steps of:

(a) mixing boron phosphate, the at least one alkaline earth metal, and optionally a chemically inert diluent,
(b) compressing the mixture to form a compact such as a pellet or an ingot,
(c) heating the compressed mixture obtained in step (b) for initiating locally the reaction between boron phosphate and the at least one alkaline earth metal, and
(d) recovering boron phosphide.

EXAMPLE

Amorphous boron phosphate ($BPO_4$) and magnesium metal (>99.5%, 315/200 µm) in 1:4.1 molar ratio (a small excess of magnesium) and about 50% NaCl ($T_{melt}$=1074 K) were mixed and pressed in a steel die at a load corresponding to the pressure of 0.6 GPa into pellets 40 mm in diameter and 20 mm high (experimental density 1.5-1.6 g/cm$^3$).

To conduct the reaction, a pellet was placed onto a substrate from pressed MgO, the center of its upper surface was heated to ~1000 K by a sharp flame of a gas burner thus initiating the Self-Propagating High-Temperature Synthesis, and covered with an alumina crucible to prevent the oxidation of magnesium by atmospheric oxygen.

In the course of the reaction, a large quantity of heat is released and the time of complete combustion of a pellet is 20-30 s.

After cooling, the resulting loosely held compacts were crushed, treated with distilled water, and the residue was boiled for an hour in excess of 5N-hydrochloric acid, and then many times washed with distilled water, and dried in air at 50° C.

The yield of boron phosphide was 35%.

The product shows an almost single-phase (>98%) with a lattice parameter of a=4.5356(9) Å, which is close to the literature value (4.537 Å) and a mean particle size of 100-200 nm.

The Raman spectra of the washed reaction product exhibit two features: strong asymmetric line at ~828 cm$^{-1}$ and weak broad line at 800 cm$^{-1}$ that are characteristic bands for BP.

The invention claimed is:
1. A process for the synthesis of boron phosphide (BP), said process comprising:
the reduction of boron phosphate ($BPO_4$) with at least one alkaline earth metal (EA) by mixing boron phosphate and the at least one alkaline earth metal, according to Equation (1):

$$BPO_4 + 4EA \rightarrow BP + 4EA(O) \qquad (1),$$

wherein said process is a self-propagating high temperature synthesis, and
wherein a part of a mixture comprising boron phosphate and the at least one alkaline earth metal is heated for initiating locally the reaction between boron phosphate and the at least one alkaline earth metal.

2. The process according to claim 1 wherein the at least one alkaline earth metal is magnesium, calcium, or mixture thereof.

3. The process of claim 2, wherein the alkaline earth metal is magnesium.

4. The process according to claim 1, wherein the reaction is initiated by heating the mixture at a temperature comprised between 800 and 1100 K.

5. The process of claim 4, wherein the reaction is initiated by heating the mixture at a temperature of 1000 K.

6. The process according to claim 1, wherein the reaction is initiated by heating the mixture between 10 and 60 seconds.

7. The process according to claim 1, wherein the mixture comprising boron phosphate and the at least one alkaline earth metal further comprises a chemically inert diluent.

8. The process according to claim 7 wherein the amount of the chemically inert diluent represents between 40 and 60% by weight of the total weight of the mixture.

9. The process of claim 7, wherein the chemically inert diluent is sodium chloride.

10. The process of claim 7, wherein the amount of the chemically inert diluent represents between 50% by weight of the total weight of the mixture.

11. The process of claim 1 wherein the ratio of boron phosphate to the at least one alkaline earth metal is comprised between 1:3.8 and 1:4.2.

12. The process of claim 1 comprising the steps of:
(a) mixing boron phosphate, the at least one alkaline earth metal, and optionally a chemically inert diluent,
(b) compressing the mixture to form a compact such as a pellet or an ingot,
(c) heating the compressed mixture obtained in step (b) for initiating locally the reaction between boron phosphate and the at least one alkaline earth metal, and
(d) recovering boron phosphide.

13. The process of claim 1, wherein the ratio of boron phosphate to the at least one alkaline earth metal is comprised between 1:4 and 1:4.1.

14. The process according to claim 1, wherein the self-propagating high temperature synthesis is realized by using a tungsten filament, a graphite plate heated by Joule effect, a flame, or a laser pulse.

* * * * *